United States Patent
Chang

(10) Patent No.: US 8,894,746 B2
(45) Date of Patent: Nov. 25, 2014

(54) ODOR KILLING CHARCOAL BOX SYSTEMS

(76) Inventor: Alice Chang, Los Angeles, CA (US)

(*) Notice: Subject to any disclaimer, the term of this patent is extended or adjusted under 35 U.S.C. 154(b) by 177 days.

(21) Appl. No.: 13/459,304

(22) Filed: Apr. 30, 2012

(65) Prior Publication Data

US 2013/0139692 A1 Jun. 6, 2013

Related U.S. Application Data

(60) Provisional application No. 61/566,119, filed on Dec. 2, 2011.

(51) Int. Cl.
*B01D 53/02* (2006.01)

(52) U.S. Cl.
USPC .................................. 95/90; 96/138; 422/122

(58) Field of Classification Search
USPC ................ 96/108, 134, 138, 147, 151; 95/90; 422/5, 120, 122
See application file for complete search history.

(56) References Cited

U.S. PATENT DOCUMENTS

| | | | | |
|---|---|---|---|---|
| 1,806,149 A * | 5/1931 | Daugherty | ....................... | 239/57 |
| 1,972,368 A * | 9/1934 | Alex | ............................ | 96/121 |
| 2,387,957 A * | 10/1945 | Topjian | ............................. | 422/5 |
| 2,765,046 A * | 10/1956 | Rondholz | ....................... | 62/271 |
| 3,421,839 A * | 1/1969 | Ward | ............................. | 422/120 |
| 3,739,558 A * | 6/1973 | Hurson | ........................... | 96/151 |
| 4,225,539 A * | 9/1980 | Grants | ............................. | 261/99 |
| 4,333,752 A * | 6/1982 | Thies et al. | ...................... | 96/135 |
| 4,604,110 A * | 8/1986 | Frazier | ............................. | 95/128 |
| 4,624,366 A * | 11/1986 | Marder et al. | ................... | 62/271 |
| 4,995,556 A * | 2/1991 | Arnold, III | ....................... | 239/57 |
| 5,015,276 A | 5/1991 | Hedberg et al. | | |
| 5,032,360 A | 7/1991 | Houston | | |
| 5,174,462 A | 12/1992 | Hames | | |
| 5,492,675 A * | 2/1996 | Brizard | ......................... | 422/122 |
| 6,767,521 B1 * | 7/2004 | Vogt et al. | ...................... | 422/306 |
| 6,923,850 B2 * | 8/2005 | Tanaka | ............................. | 96/118 |
| 2006/0081632 A1 | 4/2006 | Shieh | | |
| 2007/0151877 A1 | 7/2007 | Newman | | |

* cited by examiner

*Primary Examiner* — Frank Lawrence
(74) *Attorney, Agent, or Firm* — RG Patent Consulting, LLC; Rachel Gilboy

(57) ABSTRACT

An odor-killing charcoal box system which can eliminate strong odors by absorbing and neutralizing the odors safely and inexpensively thereby improving the air quality in virtually any given interior area. This unique product can comprise a paper cube, which can measure approximately 4" by 4" by 4". The sides of the box can be made of porous, natural breathable fabrics, such as cotton or linen. The box may be opened up on five sides (or less.) By exposing these five sides, the box can create maximum surface area exposure for the activated charcoal powder to absorb odor effectively from the surrounding area.

3 Claims, 5 Drawing Sheets

ODOR KILLING CHARCOAL BOX SYSTEMS

CROSS-REFERENCE TO RELATED APPLICATION

The present application is related to and claims priority from prior provisional application Ser. No. 61/566,119, filed Dec. 2, 2011 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of odor removal and more specifically relates to odor killing charcoal box systems.

2. Description of the Related Art

The majority of individuals in modern society live in some form of dwelling. These dwellings may not have adequate ventilation and various items within the enclosed structures may emit odors that are offensive to occupants. Odors, especially in contained areas like refrigerators, bathrooms, kid's bedrooms, closets, and anywhere in a kitchen, can quickly develop and spread throughout the building. Sometimes, if the odors are really strong, they can permeate into the walls, carpet, clothing, furniture, or anything else that may be in close proximity, causing damage to such items. To prevent this from happening, people may set out baking soda, but this may not be effective for pungent odors, especially in large open spaces. People may also use room sprays or air fresheners, but these solutions may only temporarily mask the odor, rather than remove it. Further, air fresheners may be expensive, cause allergies and downgrade indoor air quality. Removing offensive odors in a cost-effective manner is desirable.

Various attempts have been made to solve the above-mentioned problems such as those found in U.S. Pat. and Pub. Nos. 1,972,368; 5,174,462; 5,015,276; 2006/0081632; 5,032,360; and 2007/0151877. This prior art is representative of odor combating means. None of the above inventions and patents, taken either singly or in combination, is seen to describe the invention as claimed.

Ideally, an odor killing charcoal box system should be user-friendly, not downgrade indoor air quality, safe and, yet would operate reliably and be manufactured at a modest expense. Thus, a need exists for a reliable odor killing charcoal box system to avoid the above-mentioned problems.

BRIEF SUMMARY OF THE INVENTION

In view of the foregoing disadvantages inherent in the known odor removal means art, the present invention provides a novel odor killing charcoal box system. The general purpose of the present invention, which will be described subsequently in greater detail is to provide efficient, effective and safe odor absorbing and neutralizing means.

Odor-Killing Charcoal Box System can absorb and neutralize odors to improve air quality in any room in the home or various other locations. This innovative product can resemble charcoal powder in a cubic paper box. The charcoal powder preferably comprises a fine, black powder that can also be odorless, tasteless, non-toxic, and completely natural. This product can be ideal for anywhere in the home, in the office, and in cars, but it can be especially helpful for enclosed spaces such as closets, refrigerators, washrooms, basements, and garages.

An odor-absorbing charcoal box system is disclosed herein, in a preferred embodiment comprising: a porous housing; an edge-supporting perimeter frame; and activated charcoal powder. The porous housing comprises a first wall, a second wall, a third wall, a fourth wall, a fifth wall and a sixth wall; wherein the sixth wall of the porous housing comprises a bottom side and the first wall comprising a top side (the other sides comprising side walls adjoining to the top and bottom). The first wall, second wall, third wall, fourth wall, and fifth wall are able to be opened (hingedly about an edge, removed or otherwise opened) to create maximum surface area exposure of the activated charcoal powder to an ambient environment to absorb odors.

The porous housing comprises a cube (or other shapes/exterior profiles may be used) having dimensions of about four inches wide, about four inches high and about four inches long in preferred embodiments. The edge-supporting perimeter frame surrounds and supports the porous housing; wherein the edge-supporting perimeter frame comprises plastic (or other material.) The porous housing may comprise a breathable-fabric which may comprise cotton or other suitable porous material/fabric.

The porous housing contains the activated charcoal powder; the activated charcoal powder held/contained within an inner volume of the porous housing. The activated charcoal powder is non-toxic, and odorless. The activated charcoal powder is useable to absorb and neutralize various odors from an ambient environment to improve air quality in an interior (room) space. A kit is also disclosed herein of the porous housing, surrounded with the edge-supporting perimeter frame (optional); and a pre-determined amount of activated charcoal powder.

A method of use for the odor-absorbing charcoal box system is also disclosed herein preferably comprising the steps of: locating a porous housing filled with activated charcoal powder in an enclosed space; opening a first wall, a second wall, a third wall, a fourth wall, and a fifth wall allowing the activated charcoal powder to be in communication with the ambient environment through the porous housing; and absorbing and neutralizing odors from the ambient environment to improve air quality within an interior space. The method may further comprise the step of discarding (used) activated charcoal powder when no longer effective to eliminate the odors and refilling the porous housing with (fresh) activated charcoal powder.

The present invention holds significant improvements and serves as an odor killing charcoal box system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, odor killing charcoal box systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an odor combating device and more particularly to an odor killing charcoal box systems as used to improve the quality and smell of indoor air.

Generally speaking, the odor-killing charcoal box system can eliminate strong odors by absorbing and neutralizing them, improving the air quality in any given area. This unique product can comprise a paper box, shaped like a cube that can measure approximately 4" by 4" by 4". The sides of the box can be made of porous, natural breathable fabrics, such as cotton or linen or the like. The box may be opened up on five sides (sides and top.) By exposing these five sides, the box can create maximum exposure for the activated charcoal powder to absorb odor effectively. Those with ordinary skill in the art will now appreciate that upon reading this specification and by their understanding the art of odor control, neutralizing and elimination as described herein, methods (and means) of using activated charcoal powder (or other suitable equivalent substitute) will be understood by those knowledgeable in such art.

Figure 1:
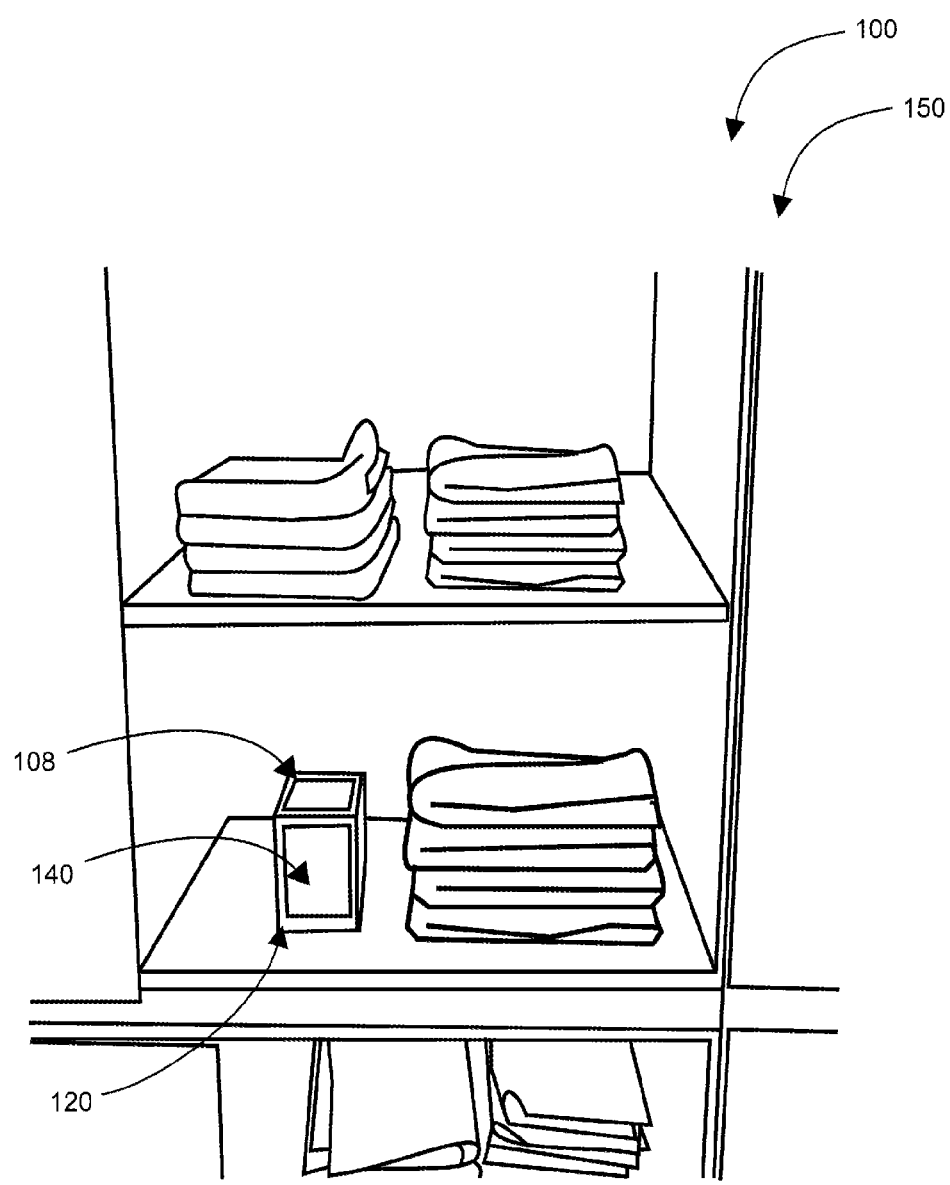
FIG. 1 shows a perspective view illustrating a carbon-filled cube of an odor killing charcoal box system in an in-use condition according to an embodiment of the present invention.

Referring to the drawings by numerals of reference there is shown in FIG. 1, a perspective view illustrating carbon-filled cube 108 of odor killing charcoal box system 100 in an in-use condition 150 according to an embodiment of the present invention.

Odor-absorbing charcoal box system 100 comprises: porous housing 110; edge-supporting perimeter frame 120; and activated charcoal powder 130. Edge-supporting perimeter frame 120 surrounds and supports porous housing 110. Porous housing 110 contains activated charcoal powder 130; activated charcoal powder 130 held within inner volume 106 of porous housing 110. Edge-supporting perimeter frame 120 comprises plastic in preferred embodiments and may comprise other materials in alternate embodiments. Activated charcoal powder 130 is useable to absorb and neutralize odors from an ambient environment to improve air quality.

Figure 2:
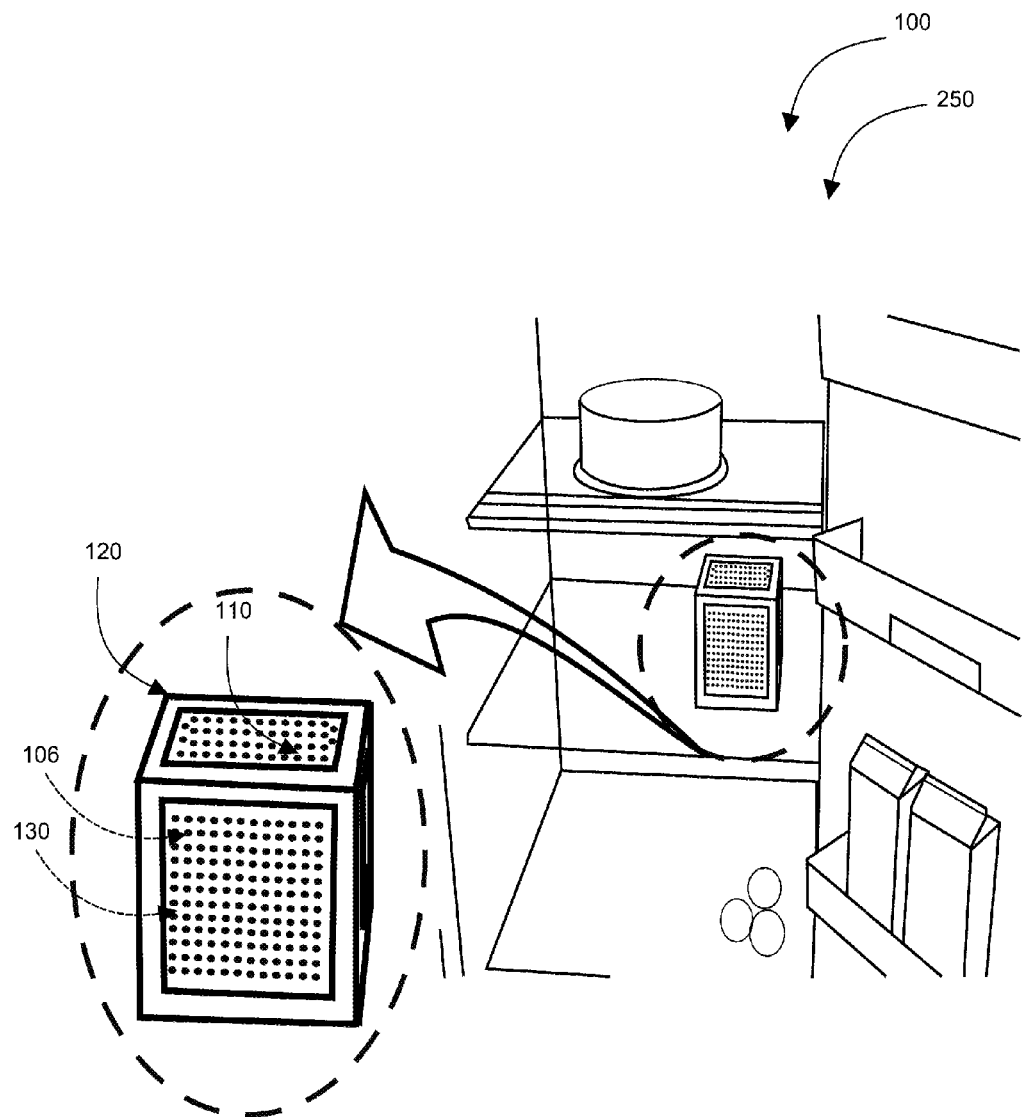
FIG. 2 is a perspective view illustrating the carbon-filled cube of the odor killing charcoal box system in another in-use condition according to an embodiment of the present invention of FIG. 1.

Referring now to FIG. 2, a perspective view illustrating carbon-filled cube 108 of odor killing charcoal box system 100 in another in-use condition 250 according to an embodiment of the present invention of FIG. 1.

Porous housing 110 (carbon-filled cube 108) comprises (at least, equal to, or less than) first wall 111, second wall 112, third wall 113, fourth wall 114, fifth wall 115, and sixth wall 116. First wall 111 of porous housing 110 comprises top side 118 and sixth wall 116 comprises bottom side 117. First wall 111, second wall 112, third wall 113, fourth wall 114, and fifth wall 115 are able to be opened to create maximum surface area exposure of activated charcoal powder 130 to the ambient environment to absorb odors, thereby creating a fresh-smelling environment. Porous housing 110 preferably comprises at least one breathable-fabric 140 such as cotton, linen or other suitable equivalent porous material. Porous housing 110 may comprise cardboard. Porous housing 110 may comprise other materials such as plastic, ferrous and non-ferrous, composite(s) or other suitable equivalent products.

Figure 3:
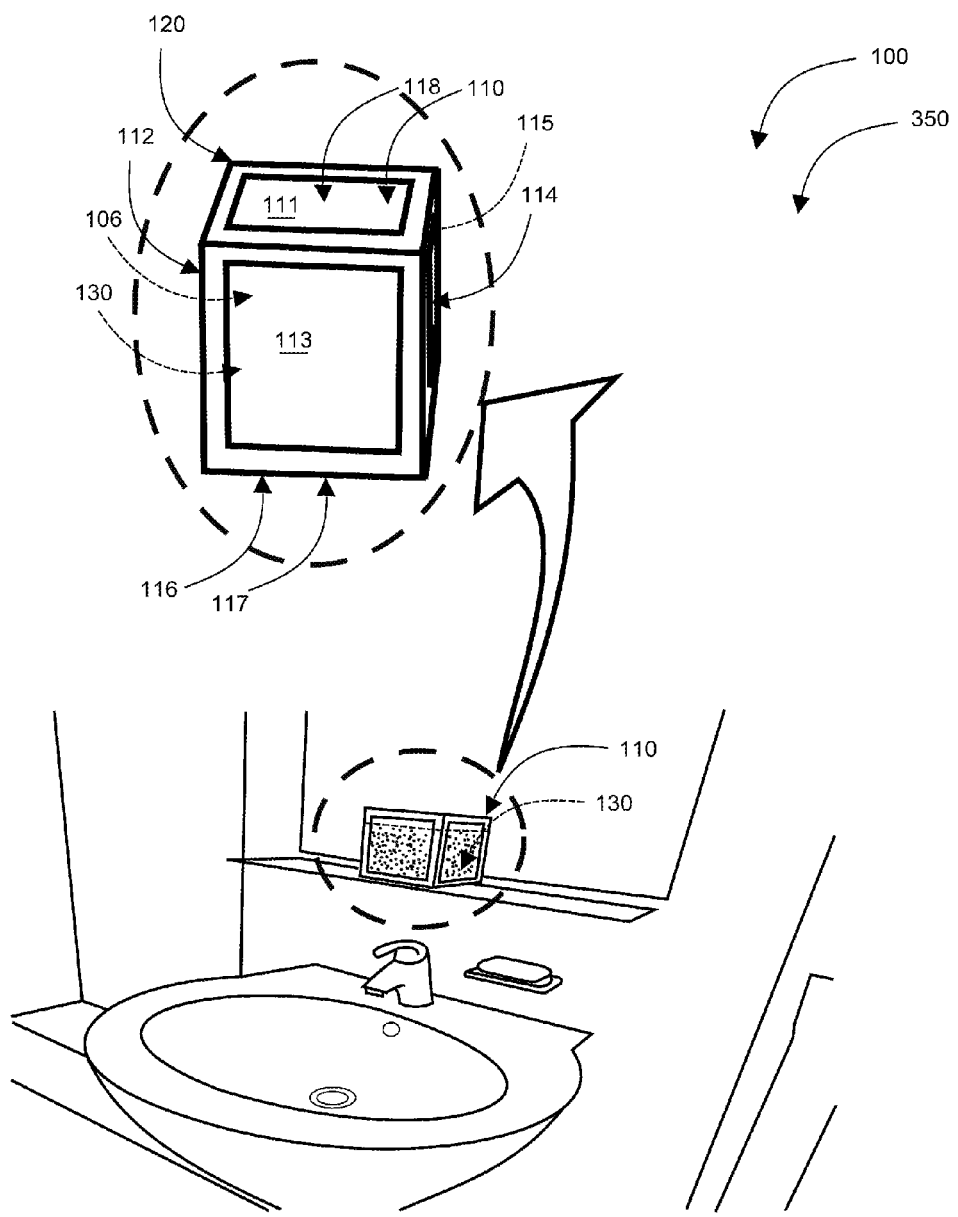
FIG. 3 is a perspective view illustrating the carbon-filled cube of the odor killing charcoal box system in yet another in-use condition according to an embodiment of the present invention of FIG. 1.

Referring now to FIG. 3, illustrating carbon-filled cube 108 of odor killing charcoal box system 100 in yet another in-use condition 350 according to an embodiment of the present invention of FIG. 1.

Figure 4:
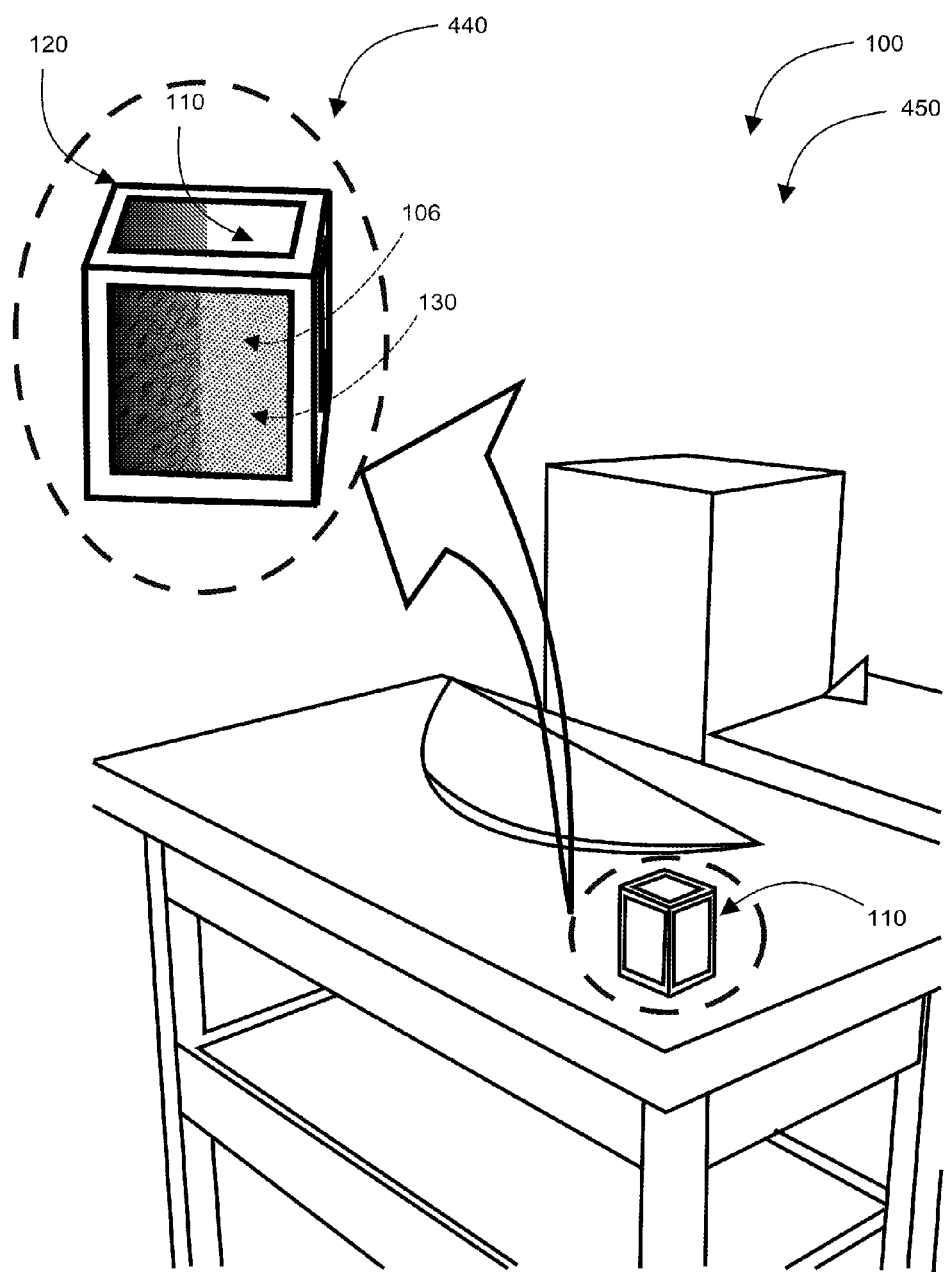
FIG. 4 is a perspective view illustrating the carbon-filled cube of the odor killing charcoal box system in yet another in-use condition according to an embodiment of the present invention of FIG. 1.

Porous housing 110 comprises a cube in preferred embodiments having dimensions of about four inches wide, about four inches high and about four inches long. Porous housing 110 may comprise other shapes and sizes, as per in-use application. The ambient environment generally referred to within this disclosure comprises an interior room and/or an enclosed space such as a linen closet as shown in FIG. 1 (in-use condition 150), a refrigerator/pantry as shown in FIG. 2 (in-use condition 250), a washroom as shown in FIG. 3 (in-use condition 350), a kitchen as shown in FIG. 4, bedroom or other such interior room. In this way the present invention can neutralize odors that originate from food, odors that result from stagnant spaces, washroom odors and the like. The present invention may be used in virtually any interior room and/or space of a residential or commercial building effectively reducing or eliminating odors.

The advantages related to using activated charcoal powder 130 is that it is non-toxic, and odorless thus providing a safe and healthy means for eliminating odors. The fact that activated charcoal powder 130 is safe makes it favorable for use without worrying that children may become injured from contact or the like.

Referring now to FIG. 4, a perspective view illustrating carbon-filled cube 108 of odor killing charcoal box system 100 in yet another in-use condition 450 according to an embodiment of the present invention of FIG. 1.

Porous housing 110 may comprise fine mesh screen in alternate embodiments, the mesh screen attached to edge-supporting perimeter frame 120. In these particular embodiments fine mesh screen may be located on first wall 111, second wall 112, third wall 113, fourth wall 114, fifth wall 115; sixth wall 116 comprising a non-porous-wall. Each of first wall 111, second wall 112, third wall 113, fourth wall 114, fifth wall 115 of a small-grid-size suitable to contain activated charcoal powder 130, sixth wall 116 also containing activated charcoal powder 130 to prevent it from egressing from inner volume 106. Activated charcoal powder 130 is still able to communicate with the ambient environment to improve air quality via the porous consistency of porous housing 110.

Odor killing charcoal box system 100 may be sold as kit 440 including porous housing 110, surrounded with the edge-supporting perimeter frame 120; and a pre-determined amount of activated charcoal powder 130. Odor killing charcoal box system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
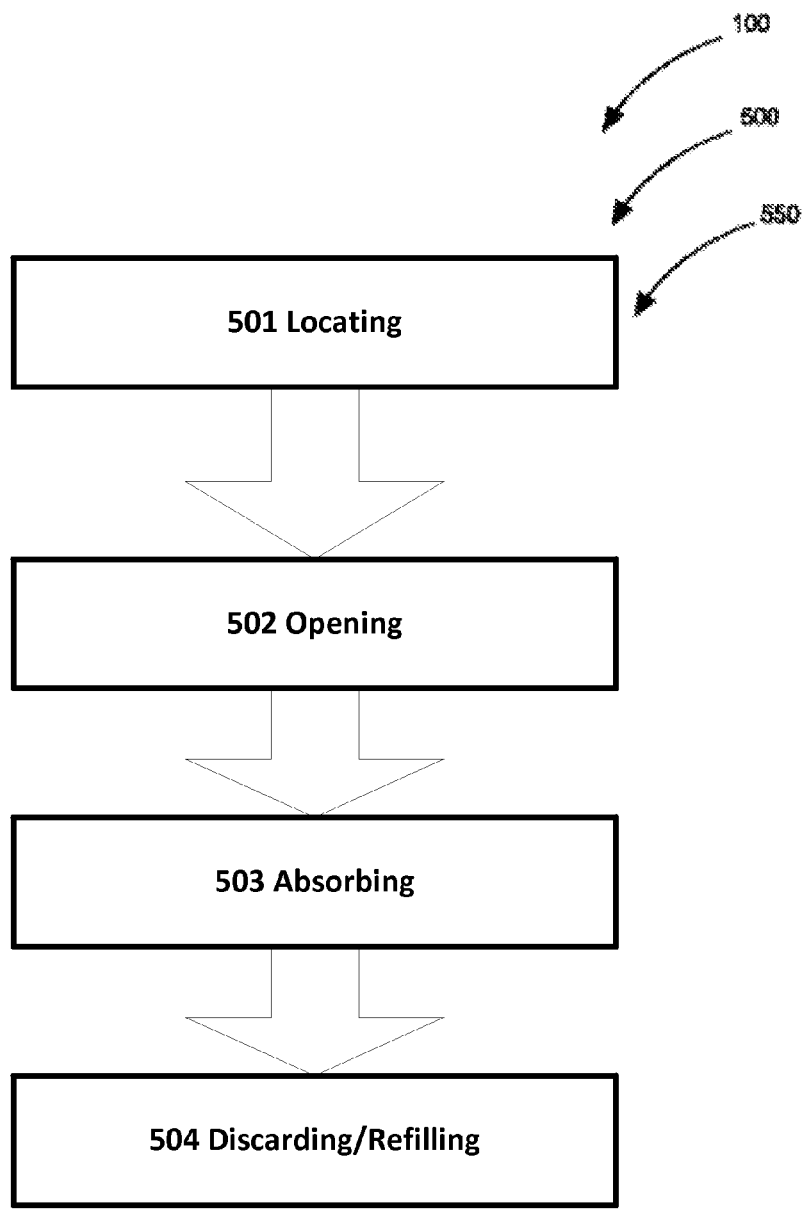
FIG. 5 is a flowchart illustrating a method of using the odor killing charcoal box system according to an embodiment of the present invention of FIGS. 1-4.

Referring now to FIG. 5, a flowchart 550 illustrating a method of using (method of use 500) odor killing charcoal box system 100 according to an embodiment of the present invention of FIGS. 1-4.

Method of use 500 for odor-absorbing charcoal box system 100 preferably comprises the steps of: step one 501 locating porous housing 110 (filled with activated charcoal powder 130) in an enclosed space; step two 502 opening first wall 111, second wall 112, third wall 113, fourth wall 114, and fifth wall 115 allowing activated charcoal powder 130 to be in communication with an ambient environment through porous housing 110 (in versions where porous housing 110 needs to be opened); and step three 503 absorbing and neutralizing odors from the ambient environment to improve air quality within the interior space. Method of use 500 may further comprise the step four 504 of discarding (used-up) activated charcoal powder 130 when no longer effective to eliminate odors and refilling porous housing 110 with (fresh) activated charcoal powder 130.

It should be noted that step four 504 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An odor-absorbing charcoal box system comprising:
    a) a porous housing;
    b) an edge-supporting perimeter frame; and
    c) activated charcoal powder;
    d) wherein said porous housing comprises a first wall, a second wall, a third wall, a fourth wall, a fifth wall and a sixth wall;
    e) wherein said sixth wall of said porous housing comprises a bottom side;
    f) wherein said first wall of said porous housing comprises a top side;
    g) wherein said first wall, said second wall, said third wall, said fourth wall, and said fifth wall are able to be opened to create maximum surface area exposure of said activated charcoal powder to an ambient environment to absorb odors;
    h) wherein said porous housing comprises a cube having dimensions of about four inches wide, about four inches high and about four inches long;
    i) wherein said edge-supporting perimeter frame surrounds and supports said porous housing;
    j) wherein said edge-supporting perimeter frame comprises plastic;
    k) wherein said porous housing comprises a breathable-fabric;
    l) wherein said breathable-fabric comprises cotton;
    m) wherein said porous housing contains said activated charcoal powder; said activated charcoal powder held within an inner volume of said porous housing;
    n) wherein said activated charcoal powder is non-toxic, and odorless; and wherein said activated charcoal powder is useable to absorb and neutralize said odors from said ambient environment to improve air quality in an interior space.

2. A method of use for the odor-absorbing charcoal box system of claim 1 comprising the steps of:
    a) locating said porous housing filled with activated charcoal powder in an enclosed space;
    b) opening said first wall, said second wall, said third wall, said fourth wall, and said fifth wall allowing said activated charcoal powder to be in communication with an ambient environment through said porous housing; and
    c) absorbing and neutralizing odors from said ambient environment to improve air quality within said interior space.

3. The method of claim 2 further comprising the step of discarding used said activated charcoal powder when no longer effective to eliminate said odors and refilling said porous housing with fresh said activated charcoal powder.

* * * * *